United States Patent [19]
Campbell

[11] 3,873,446
[45] Mar. 25, 1975

[54] SWIMMING POOL THERMOMETER

[75] Inventor: Sanford F. Campbell, Redwood City, Calif.

[73] Assignee: James L. Greenburg, Los Altos, Calif. ; a part interest

[22] Filed: June 1, 1973

[21] Appl. No.: 365,902

[52] U.S. Cl. .................. 210/169, 73/343 B, 73/354
[51] Int. Cl. .......................... G01k 1/16, E04h 3/20
[58] Field of Search ...... 73/339, 354, 343 R, 343 B, 73/431, 362.8, 373, 349; 4/172, 172.17; 52/261; 210/242, 169; 236/93 B, 94

[56] References Cited
UNITED STATES PATENTS

| 2,236,243 | 3/1941 | Cornelius | 73/343 B |
| 2,701,235 | 2/1955 | King | 210/169 |
| 2,913,903 | 11/1959 | Fried | 73/343 R |
| 3,677,408 | 7/1972 | Dinizo, Jr. | 210/169 |

FOREIGN PATENTS OR APPLICATIONS

| 359,718 | 9/1922 | Germany | 73/362.8 |

Primary Examiner—Richard C. Queisser
Assistant Examiner—Marcus S. Rasco
Attorney, Agent, or Firm—Townsend and Townsend

[57] ABSTRACT

Apparatus for measuring and indicating the temperature of the water in a swimming pool is disclosed. A rigid plate having a generally flat upper surface is adapted to be mounted flush with the decking of the swimming pool. the plate has a recess in the center thereof which holds a thermometer. The thermometer has a casing conformed to the shape of the recess in the plate, and a transparent protective face which is flush with the upper surface of the plate. A bulb shaft extends from the bottom of the thermometer casing through an aperture in the bottom of the plate. The bulb shaft is in thermal contact with the water in the swimming pool, either in the skimmer box or via a hollow tube extending from the plate to the pool interior sidewall. The temperature of the water in the pool is indicated on the thermometer below the protective face and is easily visible to anyone standing on the decking of the pool.

6 Claims, 4 Drawing Figures

PATENTED MAR 25 1975 3,873,446
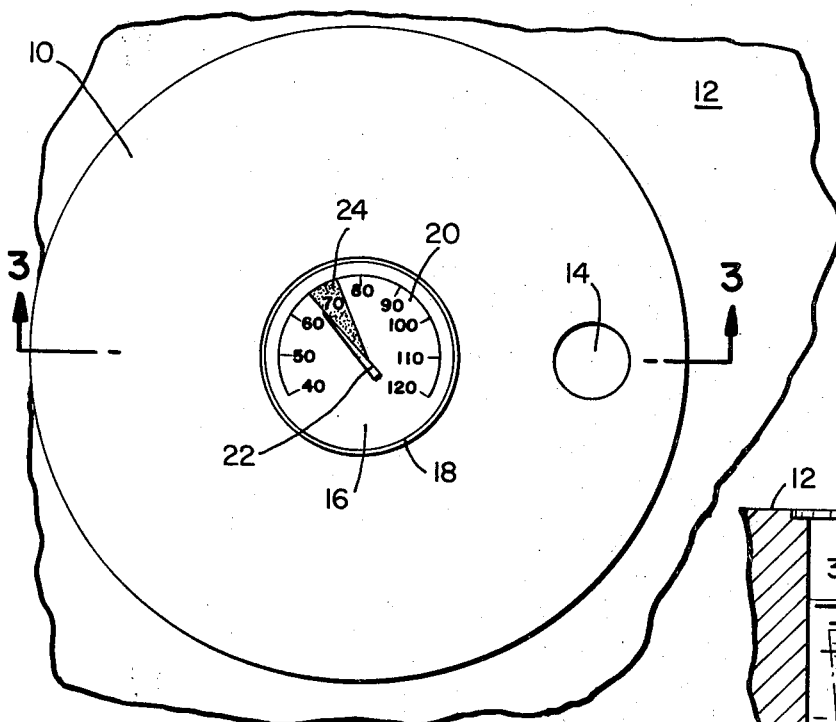
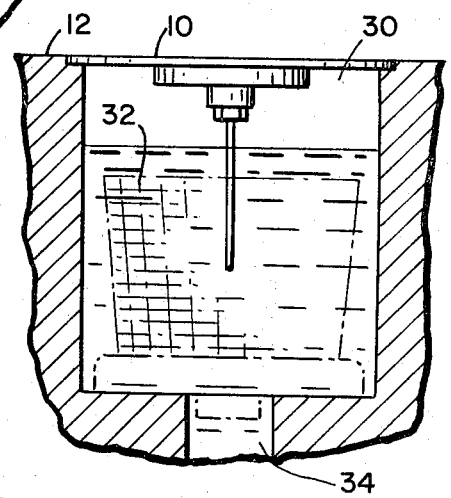
FIG_1
FIG_2
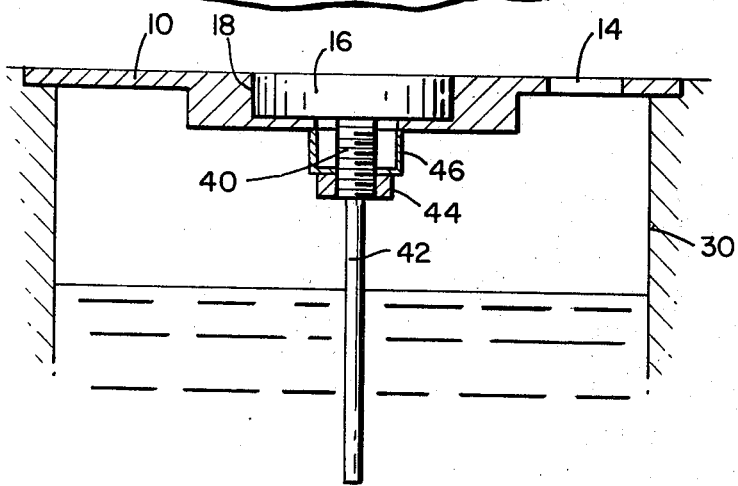
FIG_3
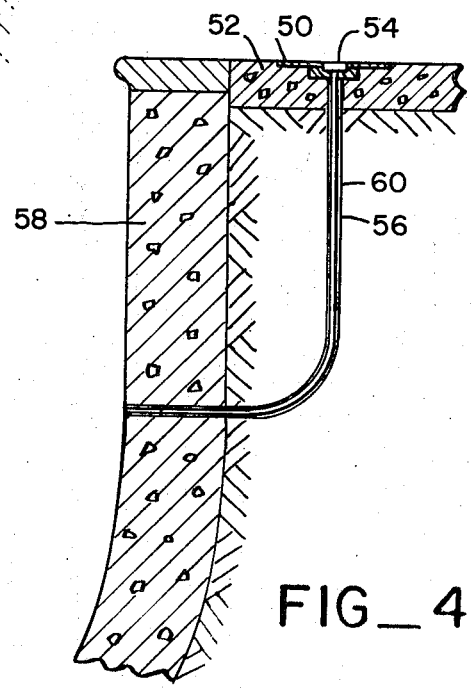
FIG_4

3,873,446

SWIMMING POOL THERMOMETER

BACKGROUND OF THE INVENTION

The present invention relates to a temperature indicating device for a swimming pool and is more particularly directed to an arrangement for mounting a thermometer which senses and displays the temperature of the water in a swimming pool in a manner which permits increased ease of reading over conventional devices.

Temperature indicating devices associated with swimming pools which sense and display the temperature of the water therein are typically hung from the side of the pool and are totally immersed in the water. When it is desired to ascertain the temperature of the water the thermometer is removed from the pool manually and read. This frequently necessitates some effort in locating and retrieving the thermometer, and if the thermometer is not read immediately, evaporation of the water will result in an erroneous reading.

Arrangements have been proposed which place the thermometer dial in a more conspicuous position so as to be more easily read. For example, U.S. Pat. No. 2,901,907, issued to Ashcroft, discloses a thermometer which is incorporated into the side rail of a conventional swimming pool ladder, while the patent to Fried, U.S. Pat. No. 2,913,903, discloses a similar arrangement wherein the temperature dial is imbedded in a foot rung of the ladder. While these approaches represent an improvement over prior devices their placement and orientation necessarily result in the fact that they can only be easily read from particular vantage points. For example, if the thermometer dial is mounted in the ladder foot rung, it is disposed below the surface of the water (and therefore below the swimming pool deck surface) and may be read only by approaching the edge of the deck and looking down into the water. The side rail mounted thermometers on the other hand are disposed essentially in a vertical plane and the dial is thus readable only from a particular direction.

In contrast, the present invention contemplates a mounting arrangement for a thermometer wherein the temperature indicating dial is flush mounted in a horizontal plane either in the swimming pool skimmer lid or in the deck surface itself. This allows the dial to be read from any direction and without approaching the edge of the pool.

In one form of the present invention a dial type thermometer is inserted into a recess provided in the center of the swimming pool skimmer lid. The skimmer is a plastic or metal box inserted into the side of the swimming pool to catch floating debris and provides an inlet for free circulation of water. The skimmer is typically provided with a round removeable lid or cover which is flush with the deck surface adjacent the pool edge. Thus, water passing through the skimmer touches the depending bulb shaft of the thermometer of the present invention and gives a reading of the temperature of the water from the top of the skimmer lid.

According to an alternative embodiment which is suitable for new pool construction, the thermometer is recessed directly into a recess formed in the pool deck surface. Before the pool is plastered a hollow tube of plastic or copper is inserted from the top of the deck and curves inwardly toward the pool interior through the reinforcing steel and its end is left stubbed out so that it will be flush with the side of the completed pool. Next a flush mounted brass or plastic plate is screwed onto the tubing at the same time the decking is constructed. The plate has a recess providing for flush mounting of the thermometer. A flexible bulb shaft depends from the thermometer and projects through the hollow tubing so that it will be flush with the side of the finished pool after plastering.

BRIEF DESCRIPTION OF THE DRAWINGS

FIG. 1 is a top plan view of the swimming pool thermometer of the present invention;

FIG. 2 is a cross-sectional elevation view of an embodiment of the present invention utilized in conjunction with the skimmer of the swimming pool;

FIG. 3 is a cross-sectional elevation view taken along lines 3—3 of FIG. 1;

FIG. 4 is an elevation view of a second embodiment of the present invention specifically directed toward new pool construction.

DESCRIPTION OF THE PREFERRED EMBODIMENTS

The general configuration of the upper surface of the thermometer assembly of the present invention is illustrated by way of reference to FIG. 1. A rigid plate 10 is disposed in the decking 12 surrounding a swimming pool. Plate 10 can be provided with a small finger hole 14 allowing for easy removal of the plate. A thermometer 16 is disposed within a central recess 18 in plate 10. Thermometer 16 has a protective face flush with the upper surface of plate 10 covering a dial surface 20. An indicator 22 is connected to temperature sensing means internal to thermometer 16, and is adapted to indicate the temperature of the water on dial 20. If desired, dial 20 can be provided with a colored or otherwise marked section 24 illustrating the preferred or most comfortable water temperature.

Utilization of the swimming pool thermometer of the present invention in combination with a standard skimmer is illustrated by way of reference to FIG. 2. A skimmer such as 30 is generally found on most swimming pools, and has a filter element 32 which collects debris from the water in the swimming pool. Water enters from an inlet from the pool proper (not shown) and passes through filter 32 and through outlet 34 back to the pool. Since filter element 32 must be cleaned periodically, skimmer 30 is provided with a removeable skimmer lid 10 (the rigid plate of FIG. 1). Skimmer lid 10 can be constructed of metal or plastic material, and has a flat upper surface adapted to remain flush with the decking 12 surrounding the pool.

Details of the skimmer lid 10 illustrated in FIG. 2 are more fully apparent by way of reference to the cross-sectional view of FIG. 3. Skimmer lid 10 has a recess 18 formed in the center thereof, and the casing of thermometer 16 is conformed to the shape of recess 18. A threaded projection 40 depends from the lower portion of thermometer 16, and a rigid bulb shaft 42 extends from threaded portion 40 and into the water contained in skimmer 30. Bulb shaft 42 and threaded portion 40 are composed of thermalconductive material to provide thermal communication between the water in skimmer head 30 and the temperature sensing mechanism in thermometer 16. It would also be possible to locate the temperature sensing mechanism at the lower end of shaft 42 and connect it to indicator 22. A bolt 44 can be used to attach thermometer 16 to skimmer lid 10, and a U-shaped spacer 46 can be provided intermediate skimmer lid 10 and bolt 44 if desired.

A second embodiment of the present invention primarily adapted for new pool construction is illustrated by way of reference to FIG. 4. A flat plate 50 of brass or other suitable material is mounted in decking 52. As in the previous embodiment, plate 50 has a central recess, and a thermometer 54 adapted to fit into that recess. A tube 56 is provided which extends from the interior surface of pool wall 58 to an aperture in the bottom of plate 50. Thermometer 54 has a flexible bulb shaft 60 which depends from the bottom of the thermometer and projects through tube 56 to a point adjacent the inner surface of pool wall 58, thereby placing thermometer 54 in thermal communication with the water in the swimming pool.

Tube 56 is set in place before the pool is plastered, and is stubbed out so as to be flush with the side of the pool after finishing. Plate 50 is attached to tube 56 after the decking 52 is installed, and the thermometer 54 then inserted.

While preferred embodiments of the present invention have been illustrated in detail, it is obvious that modifications and adaptations of those embodiments will occur to those skilled in the art. Moreover, it is to be expressly understood that those modifications and adaptations are within the spirit and scope of the present invention, as set forth in the following claims.

What I claim as new is:

1. Apparatus for measuring and indicating the temperature of the water in a swimming pool having a skimmer, said apparatus comprising:

a rigid plate adapted to overlie the skimmer and having a generally flat upper surface adapted to be mounted flush with the decking of a swimming pool, said plate having a recess in the center thereof and an aperture in the bottom of said recess and extending through said plate; and a thermometer having a casing conformed to the recess of the plate and adapted to be mounted therein, said thermometer further having a transparent protective face substantially flush with the upper surface of the plate when said thermometer is mounted in said recess, a dial face located below the protective face, and temperature indicating recess having a temperature sensing portion including a bulb shaft extending from the bottom of the casing and projecting through the aperture in the plate and into the water in said skimmer and an indicator between the dial face and the protective face.

2. In swimming pool having a surrounding deck, a skimmer located below said deck, and a skimmer lid having an upper surface adapted to be mounted flush with said deck over said skimmer and removable to provide access to said skimmer, means for measuring and indicating the temperature of the water in said swimming pool comprising:

a recess in the upper surface of the skimmer lid, and an aperture from said recess extending downwardly through said skimmer lid; and a thermometer having a casing conformed to the recess in the skimmer lid and adapted to be mounted therein, a transparent protective face substantially flush with the upper surface of the skimmer lid, a bulb shaft depending from the casing and projecting through the aperture in the skimmer lid and into the water in the skimmer, and means for indicating and displaying the temperature of water surrounding said bulb shaft immediately below said protective face so that the indicated temperature is readily visible.

3. Apparatus as recited in claim 2 wherein the bulb shaft has a wider threaded portion adjacent the casing, and additionally comprising a nut adapted to engage the threaded portion of the bulb shaft to fasten the thermometer to the skimmer lid.

4. A device for measuring and indicating the temperature of the water in a swimming pool comprising:

a rigid plate mounted in the decking of said pool, said plate having an upper surface adapted to be substantially flush with said decking, said plate further having a recess in the center thereof, and an aperture extending from said recess through the bottom of said plate;

a hollow tube extending from the aperture in the bottom of the plate to the interior surface of the side wall of the swimming pool below the water level in said pool; and a thermometer having a casing conformed to the recess in the plate and adapted to be mounted therein, a transparent protective face substantially flush with the upper surface of the plate, a flexible bulb shaft depending from the casing and projecting through the aperture and through the tube to a point adjacent the interior surface of the side wall of said pool, and means for indicating the temperature of said bulb shaft immediately below the protective face so that the indicated temperature is readily visible.

5. A device as recited in claim 4 wherein the tube is fixibly attached to the plate in spatial communication with the aperture therein.

6. Apparatus for measuring and indicating the temperature of the water in a swimming pool, said apparatus comprising:

a rigid plate having a generally flat upper surface adapted to be mounted flush with the decking of a swimming pool, said plate having recess in the center thereof and an aperture in the bottom of said recess and extending through said plate;

a hollow tube extending from the inner wall of said swimming pool below the water level in said pool to the under surface of the rigid plate in spatial communication with the aperture therethrough; and a thermometer having a casing conformed to the recess of the plate and adapted to be mounted therein, said thermometer further having a transparent protective face substantially flush with the upper surface of the plate when the thermometer is mounted in said recess, a dial face located below the protective face, and a temperature indicating means having a temperature sensing portion including a bulb shaft extending from the bottom of the casing and adapted to project through said tube and into the water in said swimming pool.

* * * * *

UNITED STATES PATENT AND TRADEMARK OFFICE
CERTIFICATE OF CORRECTION

PATENT NO. : 3,873,446
DATED : March 25, 1975
INVENTOR(S) : SANFORD F. CAMPBELL

It is certified that error appears in the above—identified patent and that said Letters Patent are hereby corrected as shown below:

Claim 1, lines 46-7, change "recess" to -- means --.

Signed and Sealed this

Eighth Day of March 1977

[SEAL]

Attest:

RUTH C. MASON
Attesting Officer

C. MARSHALL DANN
Commissioner of Patents and Trademarks